United States Patent
Bartels et al.

[11] Patent Number: 5,961,369
[45] Date of Patent: Oct. 5, 1999

[54] METHODS FOR THE IN-PROCESS DETECTION OF WORKPIECES WITH A MONOCHROMATIC LIGHT SOURCE

[75] Inventors: Anthony L. Bartels, Phoenix; Robert F. Allen, Gilbert; Paul Holzapfel, Chandler, all of Ariz.; Warren Lin, Fremont, Calif.

[73] Assignee: SpeedFam-IPEC Corp., Chandler, Ariz.

[21] Appl. No.: 09/090,666

[22] Filed: Jun. 4, 1998

Related U.S. Application Data

[60] Division of application No. 08/781,132, Jan. 9, 1997, Pat. No. 5,823,853, which is a continuation-in-part of application No. 08/683,150, Jul. 18, 1996, Pat. No. 5,733,171.

[51] Int. Cl.$^6$ .................................................. B24B 49/00
[52] U.S. Cl. ........................................ 451/5; 451/6; 451/8
[58] Field of Search .......................... 340/680; 341/155; 356/364, 366, 369; 359/177, 189; 451/5, 6, 8, 41, 285, 286, 287, 288, 289, 290

[56] References Cited

U.S. PATENT DOCUMENTS

| | | |
|---|---|---|
| Re. 34,425 | 11/1993 | Schultz . |
| 4,053,237 | 10/1977 | Casey ....................................... 451/6 X |
| 4,159,523 | 6/1979 | Neer ......................................... 364/571 |
| 4,332,833 | 6/1982 | Aspnes et al. ............................... 427/8 |
| 4,805,348 | 2/1989 | Arai et al. . |
| 4,999,628 | 3/1991 | Kakubo et al. ........................... 341/139 |
| 5,099,614 | 3/1992 | Arai et al. . |
| 5,329,732 | 7/1994 | Karlsrud et al. . |
| 5,413,941 | 5/1995 | Koos et al. .............................. 451/6 X |
| 5,433,650 | 7/1995 | Winebarger ................................ 451/6 |
| 5,486,129 | 1/1996 | Sandhu et al. ........................... 451/6 X |
| 5,498,196 | 3/1996 | Karlsrud et al. . |
| 5,498,199 | 3/1996 | Karlsrud et al. . |
| 5,499,733 | 3/1996 | LItvak . |
| 5,507,022 | 4/1996 | Uomoto ............................... 455/226.2 |
| 5,581,350 | 12/1996 | Chen et al. ............................. 356/369 |
| 5,605,760 | 2/1997 | Roberts ................................. 451/41 X |
| 5,608,526 | 3/1997 | Piwonk-Corle ........................ 356/369 |
| 5,643,044 | 7/1997 | Lund ......................................... 451/5 |
| 5,648,849 | 7/1997 | Canteloup . |
| 5,649,849 | 7/1997 | Pileri et al. ............................... 451/1 |
| 5,663,797 | 9/1997 | Sandhu ................................... 451/6 X |
| 5,667,424 | 9/1997 | Pan ........................................... 451/6 |
| 5,672,091 | 9/1997 | Takahashi ................................. 451/6 |

*Primary Examiner*—Timothy V. Eley
*Attorney, Agent, or Firm*—Snell & Wilmer

[57] ABSTRACT

A method for use with a chemical mechanical planarization (CMP) system includes an infrared LED emitter that generates an interrogation signal and directs the interrogation signal toward a polishing pad configured to process a workpiece during the CMP procedure. A reflected signal produced in response to the interrogation signal is received by a detector, and the reflected signal is processed by a converter to produce a control signal having an analog voltage. The control signal is processed and an output is produced indicative of the presence of extraneous material proximate an area of the polishing pad when the analog voltage is measured within a predetermined range. The predetermined voltage range is established such that a variety of polishing pads having different physical characteristics may be employed without altering the position of the emitter or the operating parameters of the apparatus.

10 Claims, 5 Drawing Sheets

METHODS FOR THE IN-PROCESS DETECTION OF WORKPIECES WITH A MONOCHROMATIC LIGHT SOURCE

RELATED APPLICATION

This application is a Divisional of application Ser. No. 08/781,132, filed Jan. 9, 1997, now U.S. Pat. No. 5,823,853 which is a Continuation-In-Part of application Ser. No. 08/683,150, filed Jul. 18, 1996, now U.S. Pat. No. 5,733,171 entitled "Methods and Apparatus for the In-Process Detection of Workpieces in a CMP Environment."

TECHNICAL FIELD

The present invention relates, generally, to methods and apparatus for detecting the presence of extraneous objects on a processing element during a chemical mechanical planarization (CMP) process, and more particularly to an improved technique for detecting the in-situ, in-process loss or breakage of a semiconductor wafer using a monochromatic light source and associated reflective optics.

BACKGROUND ART AND TECHNICAL PROBLEMS

The production of integrated circuits begins with the creation of high-quality semiconductor wafers. During the wafer fabrication process, the wafers may undergo multiple masking, etching, and dielectric and conductor deposition processes. Because of the high-precision required in the production of these integrated circuits, an extremely flat surface is generally needed on at least one side of the semiconductor wafer to ensure proper accuracy and performance of the microelectronic structures being created on the wafer surface. As the size of integrated circuits continues to decrease and the number of microstructures per integrated circuit increases, the need for precise wafer surfaces becomes more important. Therefore, between each processing step, it is usually necessary to polish or planarize the surface of the wafer to obtain the flattest surface possible.

For a discussion of chemical mechanical planarization (CMP) processes and apparatus, see, for example, Arai, et al., U.S. Pat. No. 4,805,348, issued February, 1989; Arai, et al., U.S. Pat. No. 5,099,614, issued March, 1992; Karlsrud, et al., U.S. Pat. No. 5,329,732, issued July, 1994; Kailsrud et al., U.S. Pat. No. 5,498,196, issued March, 1996; and Karlsrud, et al, U.S. Pat. No. 5,498,199, issued March, 1996.

Such polishing is well known in the art and generally includes attaching one side of the wafer to a flat surface of a wafer carrier or chuck and pressing the other side of the wafer against a flat polishing surface. In general, the polishing surface includes a polishing pad that has an exposed abrasive surface of, for example, cerium oxide, aluminum oxide, filmed/precipitated silica or other particulate abrasives. Commercially available polishing pads can be formed of various materials known in the art. Typically, a polishing pad may be formed from a blown polyurethane, such as the IC and GS series of polishing pads available from Rodel Products Corporation in Scottsdale, Ariz. The hardness, density, color, reflectivity, and other characteristics of the polishing pad may vary from application to application, e.g., according to the material that is to be polished.

During the polishing or planarization process, the workpiece or wafer is typically pressed against the polishing pad surface while the pad rotates about its vertical axis. In addition, to improve the polishing effectiveness, the wafer may also be rotated about its vertical axis and oscillated back and forth over the surface of the polishing pad. It is well known that polishing pads tend to wear unevenly during the polishing operation, causing surface irregularities to develop on the pad. To ensure consistent and accurate planarization and polishing of all workpieces, these irregularities must be removed.

During the CMP process, workpieces occasionally become dislodged from the workpiece carrier, or they may break during polishing. If a dislodged workpiece, a part of a broken workpiece, or other extraneous material is allowed to remain on the polishing table, it could contact other workpieces and/or workpiece carriers on the same polishing table and thereby damage or destroy all of the workpieces on the table. Accordingly, it is desirable to detect the presence of a broken or dislodged workpiece immediately and to terminate processing until the situation can be rectified. Typically, this requires a thorough cleaning and/or replacement of the polishing pad, so that workpiece fragments and other debris can be removed so that they do not damage other intact workpieces.

Presently known systems for detecting the loss of workpieces or for detecting broken workpieces are unsatisfactory in several regards. For example, currently known systems may be limited to operation with a small number of similarly colored polishing pads. Such known systems may be ineffective for detecting wafer loss on a dark colored polishing pad or in an environment where the polishing pad may become discolored over time. Present systems may also be inadequate in CMP environments that employ a large amount of polishing slurry and/or polishing slurry having a variety of colors. Furthermore, the presence of slurry, deionized water, iodine (or other CMP compounds) on the pad and on the wafer itself tend to mask the reflected light signal, preventing the signal from being properly detected by the photo detector. Consequently, many presently known workpiece detection schemes often emit "false" readings whereupon machines are shut down and processing halted even though all disks remain intact within their respective carriers.

Therefore, a technique for detecting lost or dislodged workpieces on a CMP polishing pad is thus needed which overcomes the shortcomings of the prior art.

SUMMARY OF THE INVENTION

In accordance with the present invention, methods and apparatus are provided which overcome many of the shortcomings of the prior art.

In accordance with a preferred embodiment, a probe is suitably mounted proximate the upper surface of a CMP polishing table, such that the probe projects a beam of light at the polishing table surface, wherein the beam comprises a narrow band of wavelengths; in a particularly preferred embodiment, a monochromatic light source is employed.

In accordance with a further aspect of the present invention, the probe further includes a detector for detecting a portion of the light that is reflected from the polishing table. The detector is configured to apply the reflected signal to a converter which converts the reflected light into an analog electrical signal.

In accordance with a further aspect of the present invention, the output of the converter is applied to a processor that produces an output indicative of the presence of extraneous material on the polishing pad.

In accordance with yet a further aspect of the present invention, if a dislodged or fragmented wafer is detected on the polishing pad, the processor will send a signal to a CMP machine controller, immediately stopping processing of the CMP machine, or at least those processes which could be adversely affected by the lost or fragmented workpiece.

BRIEF DESCRIPTION OF THE DRAWING FIGURES

DETAILED DESCRIPTION OF PREFERRED EXEMPLARY EMBODIMENT

The subject invention relates to the in-process detection of a dislodged or fractured workpiece on a polishing pad using at least a substantially monochromatic light emitter, an optical detector for detecting a reflected signal in response to an emitted interrogation signal, and a processor for analyzing the output of the optical detector to determine if a workpiece is on the pad. The preferred embodiment set forth herein relates to the detection of semiconductor wafers on a chemical mechanical planarization (CMP) polishing pad; it will be appreciated, however, that the principles of the present invention may be employed to detect workpieces or other materials in a variety of processing (e.g., polishing or planarization) environments such as, for example, hard disks and the like.

Figure 1:
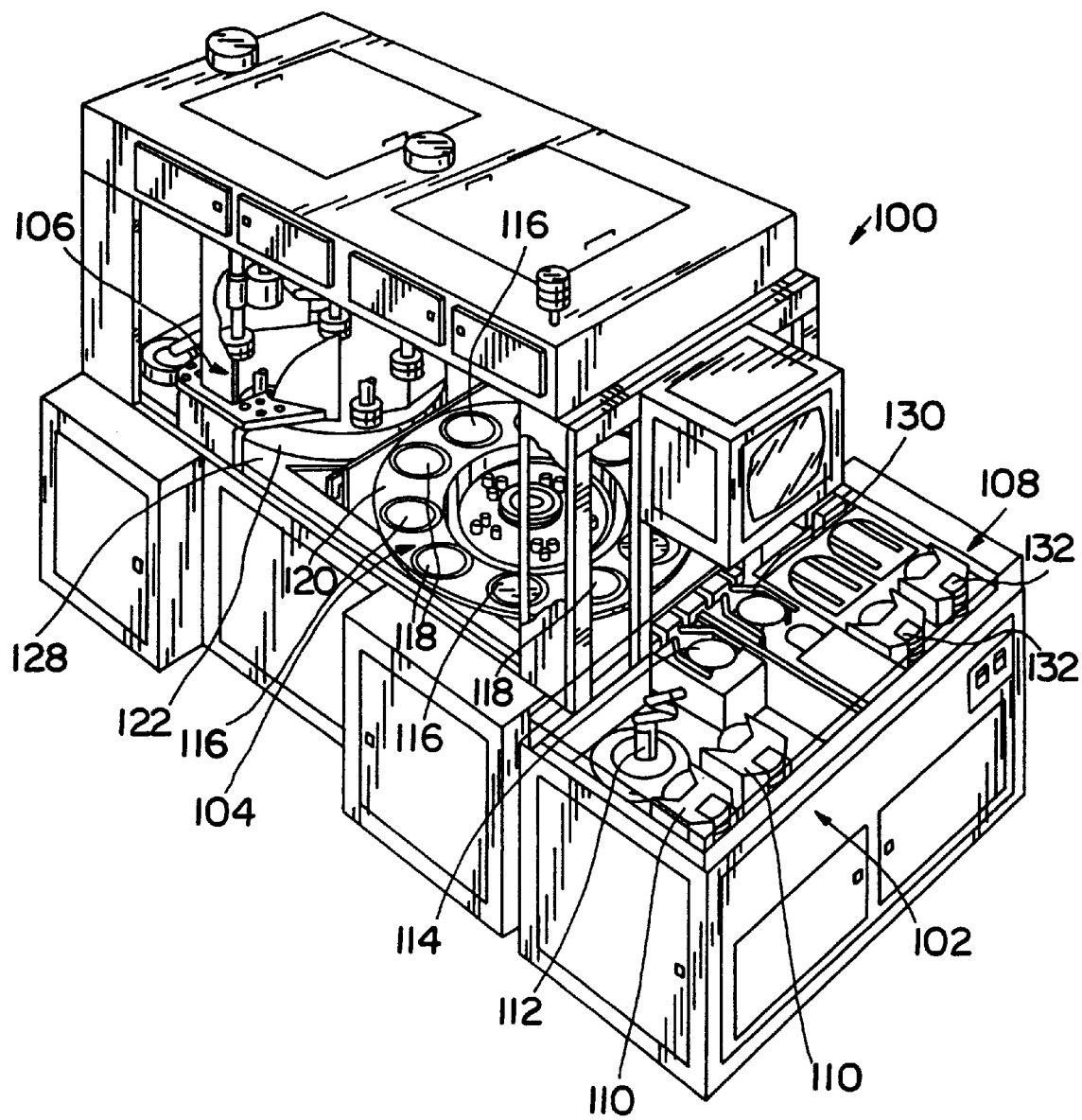
FIG. 1 is a perspective view of an exemplary CMP machine useful in the context of the present invention.
Figure 2:
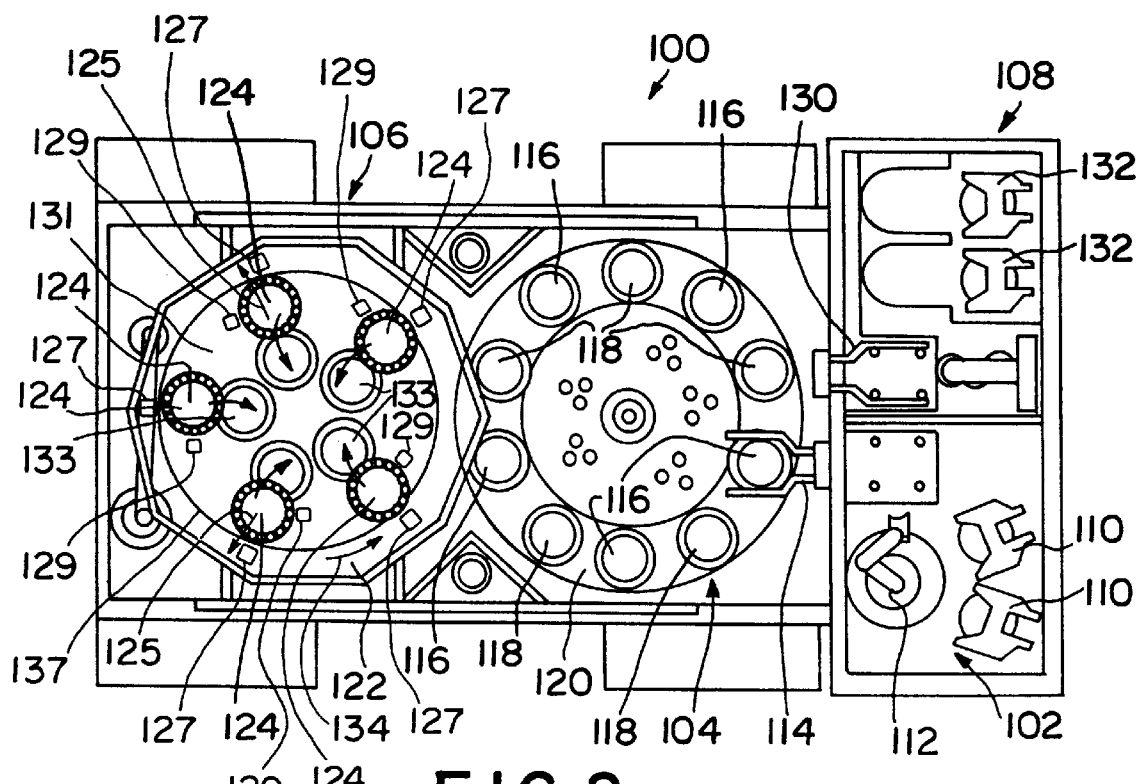
FIG. 2 is a top view of the CMP machine of FIG. 1, showing an exemplary orientation of a probe assembly in accordance with the present invention.

Referring now to FIGS. 1–2, a wafer polishing apparatus 100 in the form of a CMP system is shown embodying the present invention. Wafer polishing apparatus 100 suitably comprises a wafer polishing machine which accepts wafers from a previous processing step, polishes and optimally rinses the wafers, and reloads the wafers back into wafer cassettes for subsequent processing.

Discussing now the polishing apparatus 100 in more detail, apparatus 100 includes an unload station 102, a wafer transition station 104, a polishing station 106, and a wafer rinse and load station 108.

In accordance with a preferred embodiment of the present invention, one or more of cassettes 110, each holding a plurality of wafers, are placed into the machine at unload station 102. Next, a robotic wafer carrier arm 112 removes the wafers from cassettes 110 and places them, one at a time, on a first wafer transfer arm 114. Wafer transfer arm 114 then lifts and moves the wafer into wafer transition section 104. That is, transfer arm 114 suitably sequentially places an individual wafer on each one of a plurality of wafer pick-up stations 116 which reside on a rotatable table 120 within wafer transition section 104. Rotatable table 120 also suitably includes a plurality of wafer drop-off stations 118 which alternate with pick-up stations 116. After a wafer is deposited on one of the plurality of pick-up stations 116, table 120 will rotate so that a new station 116 aligns with transfer arm 114. Transfer arm 114 then places the next wafer on the new empty pick-up station 116. This process continues until all pick-up stations 116 are filled with wafers. In the preferred embodiment of the invention, table 120 includes five pick-up stations 116 and five drop-off stations 118.

Next, a wafer carrier apparatus 122, having individual wafer carrier elements 124, suitably aligns itself over table 120 so that respective carrier elements 124 are positioned directly above the wafers which reside in respective pick-up stations 116. The carrier apparatus 122 then drops down and picks up the wafers from their respective stations and moves the wafers laterally such that the wafers are positioned above polishing station 106. Once above polishing station 106, carrier apparatus 122 suitably lowers the wafers, which are held by individual elements 124, into operative engagement with a polishing pad 126 disposed upon a lap wheel 128. During operation, lap wheel 128 causes polishing pad 126 to rotate about its vertical axis, for example, in a counter-clockwise direction as shown by arrow 134. At the same time, individual carrier elements 124 spin the wafers about their respective vertical axes and oscillate the wafers back and forth across pad 126 (substantially along arrow 133) as they press against the polishing pad. In this manner, the surface of the wafer will be polished or planarized.

After an appropriate period of processing time, the wafers are removed from polishing pad 126, and carrier apparatus 122 transports the wafers back to transition station 104. Carrier apparatus 122 then lowers individual carrier elements 124 and deposits the wafers onto drop-off stations 118. The wafers are then removed from drop-off stations 118 by a second transfer arm 130. Transfer arm 130 suitably lifts each wafer out of transition station 104 and transfers them into wafer rinse and load station 108. In the load station 108, transfer arm 130 suitably holds each wafer while it is being rinsed. After a thorough rinsing, the wafers are reloaded into cassettes 132, which then transports the wafer to subsequent stations for further processing or packaging.

Although CMP machine 100 is shown having five polishing stations, it will be appreciated that the present invention may be employed in the context of virtually any number of polishing stations. Moreover, the present invention may also be employed in circumstances where not all of the polishing stations are functioning at the same time. For example, many standard wafer cassettes carry twenty-four individual workpieces in a single cassette. Consequently, because there are often five workpiece chucks on a single CMP machine, often times the last four disks within a cassette are polished at one time, leaving the fifth disk-holder empty.

With continued reference to FIG. 2, a respective probe assembly 129 is suitably configured on wafer carrier apparatus 122 near each carrier element 124. In accordance with a particularly preferred embodiment of the invention, each probe assembly 129 is suitably configured to optically engage at least a portion of the polishing pad surface adjacent each carrier element 124 to detect the presence of extraneous material, such as a loose screw, a wafer, or a wafer fragment on the surface of polishing pad 126 as described in greater detail below in conjunction with FIG. 3. In the context of this description, polishing pad 126 is one example of a processing element with which the present invention may be configured to interact.

In accordance with a further aspect of the invention, apparatus 100 may suitably comprise a probe 127 configured to measure surface characteristics of wafers being polished by CMP apparatus 100. A detailed description of an analogous probe configuration is disclosed in U.S. patent application Ser. No. 08/687,710, filed Jul. 26, 1996, and entitled Methods and Apparatus for the In-Process Measurement of Thin Film Layers.

Figure 3:
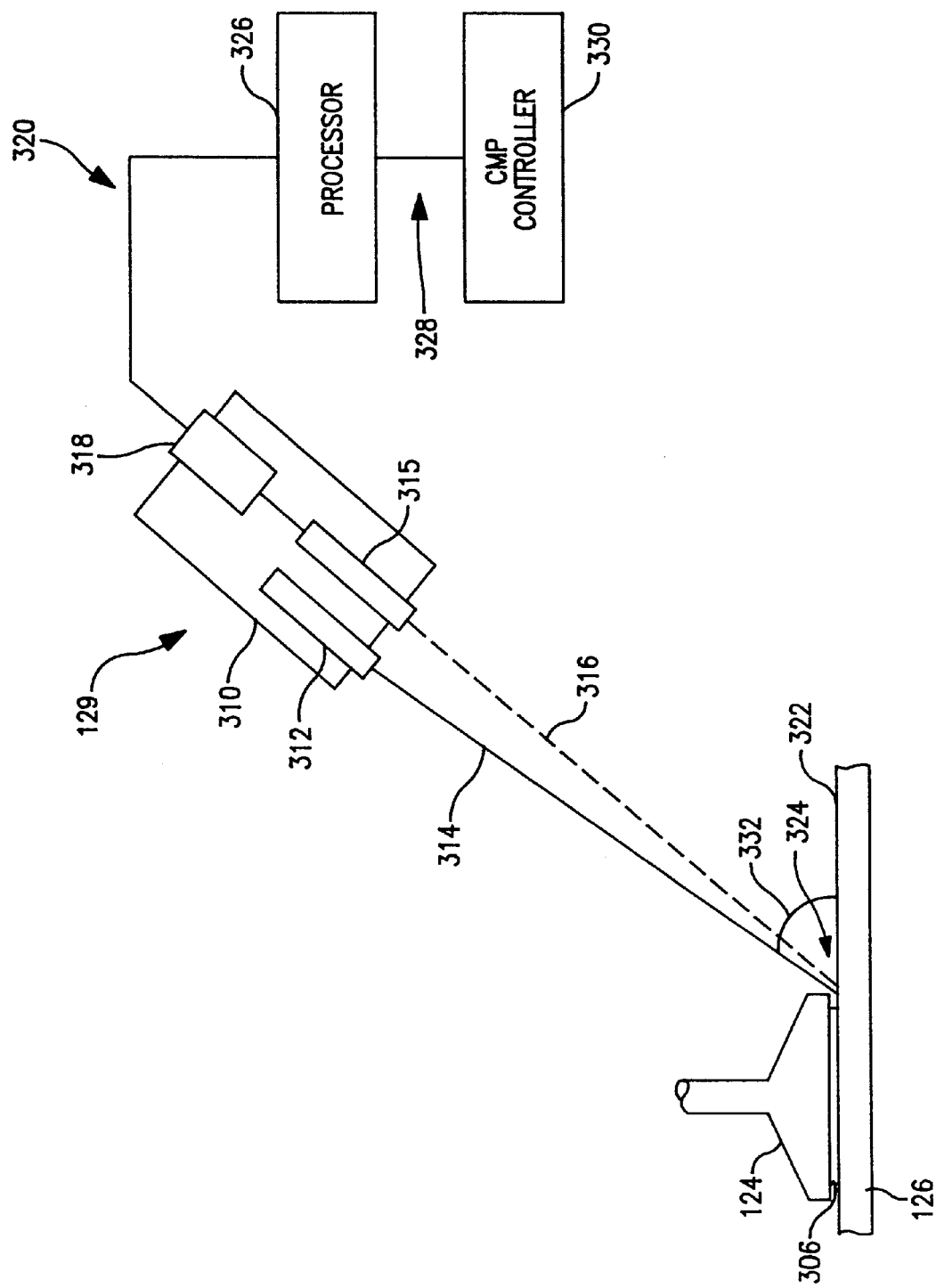
FIG. 3 is a schematic view of a probe assembly shown applying an interrogation signal to a polishing pad and capturing a reflected signal therefrom, and further including various processing components for detecting the loss of a wafer based on the reflected signal.

Referring now to FIG. 3, a schematic representation of an exemplary probe assembly 129 in accordance with the present invention is illustrated in operation within a typical CMP environment. Although apparatus 100 preferably includes a plurality of probe assemblies 129 for use with a number of carrier elements 124, only a single probe assembly 129 is illustrated in FIG. 3 for clarity. Probe assembly 129 suitably includes a housing 310, an infrared LED emitter 312 configured to emit a substantially monochromatic light beam for use as an interrogation signal 314, a detector 315 configured to receive a reflected signal 316 produced in response to interrogation signal 314, and a converter 318 configured to convert reflected signal 316 into a control signal 320 having an analog voltage associated therewith. It should be appreciated that control signal 320 may be associated with any number of measurable electrical characteristics and that control signal 320 may be a digital representation rather than an analog signal.

In the preferred embodiment, probe assembly 129 is an integral component that contains at least emitter 312, detector 315, and converter 318 within housing 310. Probe assembly 129 is suitably selected such that emitter 312 is capable of applying the desired light signal to the surface 322 of polishing pad 126. As described above, interrogation signal 314 may be a substantially monochromatic infrared light beam generated by an LED source. The preferred probe assembly 129 is commercially available from Sunx, Ltd. of Japan (currently identified as part number RS-120HF-2-SAS). Those skilled in the art will appreciate that the present invention may utilize any suitable probe assembly 129 capable of producing interrogation signal 314, receiving reflected signal 316, and producing control signal 320.

As best seen in FIG. 3, an exemplary workpiece 306 is shown being held by carrier element 124 and polished by polishing pad 126 as described above in conjunction with FIGS. 1 and 2. For clarity, the other components of apparatus 100 are omitted from FIG. 3. Probe assembly 129 is suitably mounted proximate to and above polishing pad 126 such that emitter 312 is directed at the top surface 322 of polishing pad 126. In particular, emitter 312 may be mounted under the multi-head transport assembly (MHTA) which is part of carrier apparatus 122 in an area that will suitably allow the probe to have a field of view which encompasses only a desired portion of polishing pad 126.

In accordance with the illustrated embodiment, housing 310 with probe 312 is suitably mounted above and adjacent to each carrier element 124 so that a field of view 324 of each emitter 312 is directly in front of the respective carrier element 124. That is, if polishing pad 126 is rotating counter-clockwise, as shown by arrow 134 (see FIG. 2), emitter 312 is positioned such that a wafer (or wafer fragment) will enter field of view 324 immediately upon becoming dislodged from carrier element 124. In this manner, probe assembly 129 will detect a dislodged wafer or wafer fragment as soon as possible and will stop the machine before other wafers can be damaged by the broken/dislodged workpiece or other debris. Similarly, if polishing pad 126 is rotating clockwise, emitter 312 will be configured so that field of view 324 is directed to the opposite side of each carrier element 124.

In accordance with a preferred embodiment of the present invention, housing 310 and emitter 312 may be angled so that interrogation signal 314 and/or reflected signal 316 are at a desired angle relative to surface 322 of polishing pad 126. As discussed below in more detail, housing 310 and emitter 312 may advantageously be angled with respect to the pad to achieve optimum readings.

In accordance with a particularly preferred embodiment of the present invention, and with continued reference to FIG. 3, emitter 312 suitably directs interrogation signal 314 to an area upon the top surface 322 of polishing pad 126. Reflected signal 316, which may be reflected from polishing pad 126, wafer fragments (or other extraneous material), slurry, or the like, is transmitted to detector 315. Detector 315 receives the reflected light energy, which is subsequently converted by converter 318 into control signal 320. Converter 318 is preferably connected to a processor 326, which is configured to process control signal 320 and to produce an output signal 328 indicative of the presence of extraneous material proximate field of view 324. As described in more detail below, processor 326 produces output signal 328 when control signal 320 has an analog voltage level between a predetermined range.

As described above, processor 326 indicates the presence of extraneous material proximate the area within field of view 324 when the analog voltage is measured within the predetermined range. Consequently, apparatus 100 refrains from indicating the presence of extraneous material proximate field of view 324 when the analog voltage is not measured within the predetermined range. The voltage range indicative of the presence of extraneous material is preferably established by performing empirical reflectivity tests for workpieces (e.g., semiconductor wafers) under a variety of operating conditions and environments. The voltage range may also be selected according to the operating specifications of probe 129 or other components of apparatus 100. It should be appreciated that the predetermined range is substantially independent of physical characteristics of polishing pad 126, for example, the color, reflectivity, age, or the like. Furthermore, because the voltage range is associated with the reflectivity of the wafer, the voltage range may also be configured to be substantially independent of physical characteristics of the polishing slurry used during the CMP procedure.

Prior to performing the CMP procedure, a relatively lower voltage range indicative of a first number of polishing pads having a first reflectivity range and a relatively higher voltage range indicative of a second number of polishing pads having a second reflectivity range may be established via similar empirical testing. For example, in accordance with the preferred embodiment of apparatus 100, the predetermined voltage range for wafer detection is approximately 6–8 volts, the voltage range indicative of light colored polishing pads 126 is below approximately 6 volts, and the voltage range indicative of dark colored polishing pads 126 is above approximately 8 volts. The respective voltage ranges are preferably selected such that they do not overlap. Consequently, in practice, the likelihood of false detection is reduced. It should be noted that these exemplary voltage ranges are not intended to limit the scope of the present invention, and that the actual voltage levels may vary from application to application.

Apparatus 100 may incorporate an initial training procedure for establishing the reflectivity characteristics of the current polishing pad 126 prior to the CMP planarization procedure. Such a training procedure may be desirable to compensate for fluctuations in the reflectivity of the polishing pad 126 due to wear, discoloration, or the like. The training (or calibration) procedure may be particularly useful when different polishing pads 126 are employed from time to time. An exemplary training procedure may involve directing a training signal (analogous to interrogation signal 314) at an area of polishing pad 126, e.g., proximate field of view 324. The training procedure is preferably conducted without a wafer coupled to carrier element 124, therefore, a reflected training signal (analogous to reflected signal 316)

is produced via reflection from polishing pad 126. Of course, the training procedure may be performed with any desired amount of slurry, water, or other "normal" processing materials present to simulate the intended operating environment.

The reflected training signal is detected by detector 315 and converted into an output test signal (analogous to output signal 320) by converter 318. Subsequently, processor 326, or any suitable computing device (not shown) may establish the voltage range associated with the output test signal, i.e., the voltage range indicative of the reflectivity of the current polishing pad. The voltage range may be suitably established by performing statistical analyses, e.g., conventional averaging or forecasting algorithms, on a number of individual test measurements or samples.

According to a desired aspect of the present invention, if a wafer or wafer fragment is detected, processor 326 sends output signal 328 to a CMP controller 330 which, in turn, immediately shuts down the machine. Output signal 328 may alternatively, or additionally, trigger warning devices or control various other components of apparatus 100. Rather than disabling the machine, output signal 328 may suitably adjust an appropriate operating parameter of the system to reduce or eliminate the likelihood of damage. In the preferred embodiment, emitter 312 and detector 315 operate in a substantially continuous manner and processor 326 samples control signal 320 at a suitable sampling rate. Alternatively, top surface 322 of the polishing pad may be sampled by probe assembly 129 and sampled control signals may be subsequently processed by processor 326. In the preferred embodiment, processor 326 samples control signal 320 at a frequency of approximately 1000 samples/second. As described in more detail below, the sampling rate may vary according to the desired detection sensitivity or other application specific parameters.

Processor 326 may include any general purpose controller capable of receiving control signal 320 from converter 318 and producing output signal 328. In the preferred embodiment, processor 326 is suitably configured to interpret control signal 320 and thereby determine whether a wafer or wafer fragment is present on polishing pad 126. Processor 326 is suitably configured to distinguish between the reflective characteristics of polishing pad 126 and extraneous material that may be present upon polishing pad 126, regardless of the type of polishing pad 126 and slurry used or the style of workpiece 306 being polished. Thus, even with the presence of large amounts of slurry and/or deionized water, processor 326 is adapted to detect the presence of a wafer or wafer fragment on polishing pad 126. In a particularly preferred embodiment, processor 326 suitably includes a number of digital processing components (described below).

Processor 326 is also suitably configured to generate output signal 328, which may be fed to CMP controller 330. In the preferred embodiment, output signal 328 is a binary signal indicating the presence or absence of a workpiece (or other extraneous material) on polishing pad 126. It will be understood, however, that output signal 328 may embody any suitable information or characteristics about surface 322 of polishing pad 126 necessary to convey the proper information to CMP controller 330.

Figure 4A:
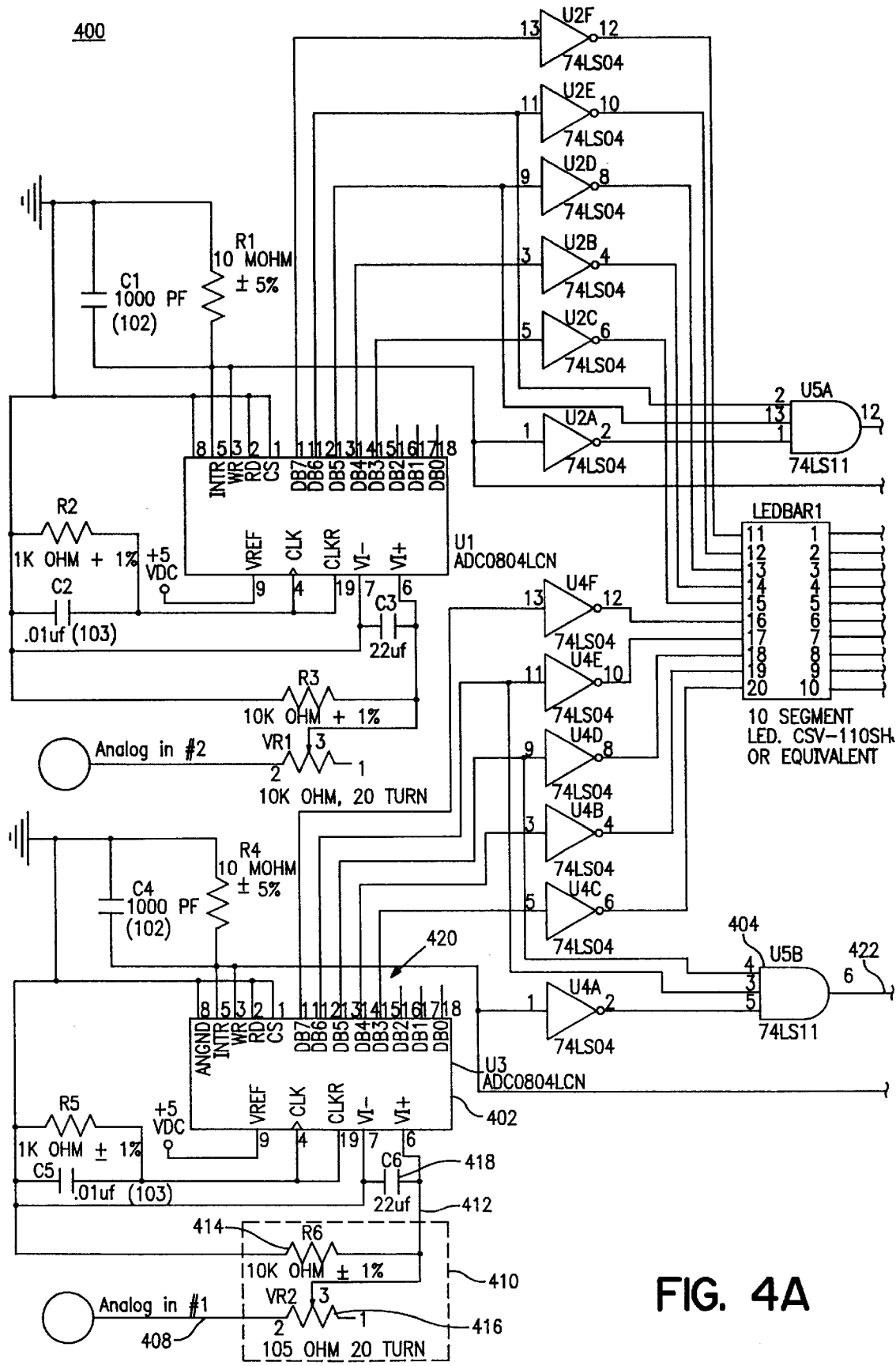
FIG. 4 is a schematic representation of an exemplary processing circuit employed by the present invention.
Figure 4B:
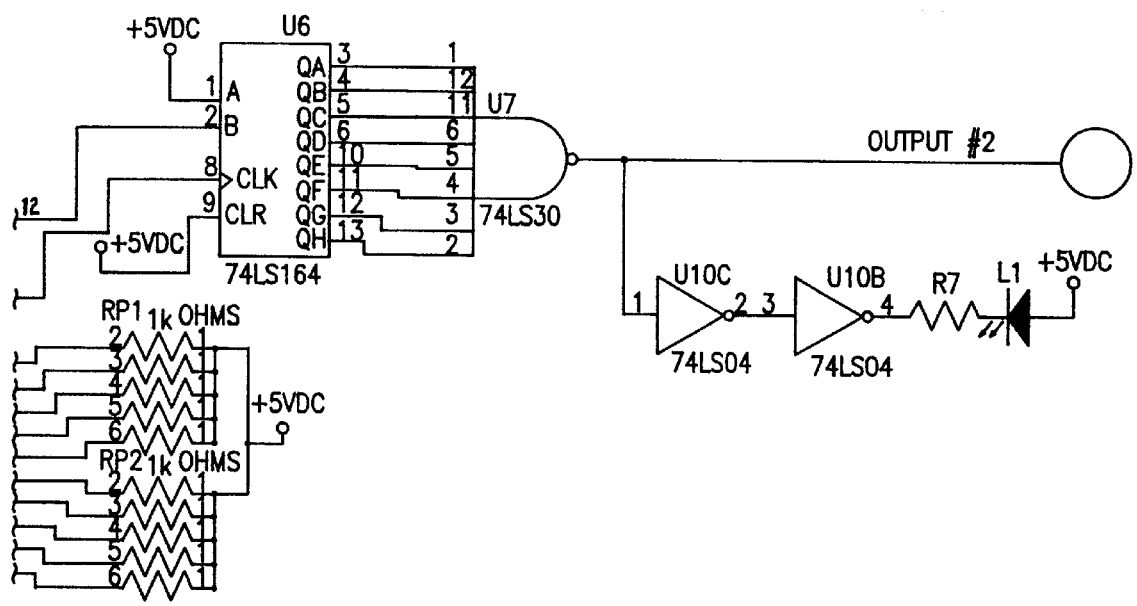
Figure 4B:
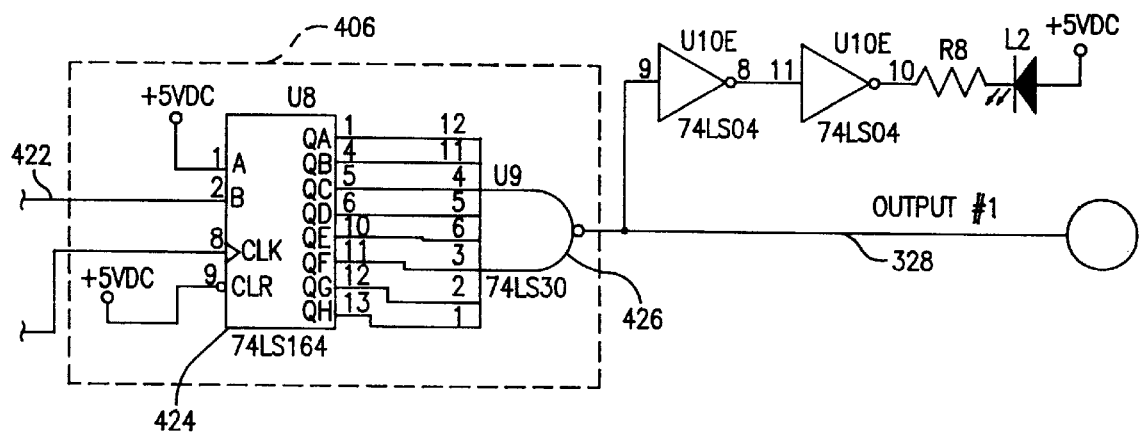

With reference to FIG. 4, an exemplary circuit 400 employed by processor 326 is illustrated as a schematic diagram. Although FIG. 4 depicts two similar processing circuits, those skilled in the art will recognize that processor 326 may incorporate any number of processing circuits depending upon, inter alia, the number of probes 129 or the number of emitters 312 utilized by apparatus 100. For the sake of clarity and brevity, only one processing circuit will be described herein.

Circuit 400 generally includes at least an analog-to-digital converter (ADC) 402, a voltage monitoring element 404, and an output element 406. Control signal 320 is preferably fed to an analog input 408 associated with ADC 402. In the preferred embodiment, analog input 408 is suitably connected to a calibration circuit 410 configured to calibrate processor 326 such that, when control signal 320 is indicative of extraneous material, an input 412 to ADC 402 is substantially within the predetermined voltage range. In other words, calibration circuit 410 may be suitably adjusted to compensate for variations in the level of control signal 320 produced by the particular probe 129 or small variations in operating parameters due to electrical tolerances of the hardware. As shown in FIG. 4, calibration circuit 410 may include a network of resistors 414 and/or potentiometers 416 that function as a voltage divider. It should be noted that calibration circuit 410 may be alternatively realized with a variety of electronic components and configured in any number of ways.

The output of calibration circuit 410, i.e., input 412, may be connected to a circuit adapted to control the detection sensitivity of processor 326. In the preferred embodiment, this circuit is realized by a 22 microfarad coupling capacitor 418 connected between input 412 and the analog ground associated with ADC 402. The precise value of coupling capacitor 418 is selected to suitably damp any analog voltage spikes that may be generated by probe 129. For example, control signal 320 may exhibit transient characteristics in response to certain operating conditions, such as a sudden flow or ripple of slurry or water. Coupling capacitor 418 controls the rate of change of input 412 to appropriately reduce the likelihood of false detection of extraneous material on surface 322 of polishing pad 126. Coupling capacitor 418 may be adjustable to enable fine tuning of the detection sensitivity of processor 326.

Input 412, which may be a derivation of control signal 320, is suitably sampled by ADC 402 to thereby produce a number of control signal samples (not shown). The analog control signal samples are then converted into corresponding digital words 420 by ADC 402. The preferred embodiment employs an eight-bit ADC 402 commercially available as part number ADC0804LCN, from Texas Instrument. In the preferred embodiment, circuit 400 is configured such that ADC 402 provides a digital output resolution of 0.5 volts. As shown in FIG. 4, ADC 402 need not utilize all eight output bits, and digital words 420 are preferably five bits long.

Voltage monitoring element 404 is configured to receive at least one output bit from ADC 402. Element 404 preferably monitors each digital word 420 to determine if the current digital word 420 is indicative of a current control signal sample having a voltage level between the predetermined range associated with the detection of a wafer, a wafer fragment, or other extraneous material. In the preferred embodiment, element 404 is realized by a 74LS11 AND gate suitably coupled to the output of ADC 402. For example, in the preferred configuration that monitors for voltages within the range of 6–8 volts, element 404 includes a first input associated with an output bit representing two volts and a second input associated with an output bit representing four volts. Thus, when the current digital word 420 represents an analog voltage of at least six volts but less than eight volts, the output of element 404 is a logic high. If the current digital word 420 represents an analog voltage less than six volts or greater than eight volts, then the output of element 404 is a logic low. Element 404 may employ additional or alternative components as necessary for the specific application.

The output 422 of voltage monitoring element 404 is preferably connected to the input of output element 406. As described above, output 422 may be a single-bit binary signal. Output element 406 is configured such that output signal 328 (see FIG. 3) is produced when a predetermined number of consecutive digital words indicate that the respective control signal samples have voltage levels between the predetermined detection range for extraneous material. Accordingly, output element 406 provides a measure of confidence to reduce the likelihood of false detection, i.e., processor 326 produces output signal 328 when a repeatable control signal 320 is measured.

In the exemplary embodiment shown in FIG. 4, output element 406 employs an eight-bit shift register 424 coupled to a 74LS30 NAND gate 426. Shift register 424, which is commercially available from Texas Instrument as part number 74LS164, operates in a conventional manner such that all eight output bits become logic high only when digital output 422 is logic high for eight consecutive samples. In response to such a state, NAND gate 426, produces a logic low state for output signal 328. Output signal 328 may be coupled to directly to CMP controller 330 or, alternatively, to any suitable circuit (not shown) for further processing.

It should be appreciated that the various logic states may be reversed or altered in a variety of ways known to those familiar with digital processing without departing from the scope of the present invention. Furthermore, the various components shown in FIG. 4 need not be discrete elements, and the present invention may utilize any number of ICs, ASICs or other semiconductor chips for purposes of circuit 400. Those skilled in the digital signal processing art will also recognize that the functionality of circuit 400 may alternatively be realized with software programming instructions rather than with the hardware implementation shown in FIG. 4.

In accordance with the preferred embodiment, if output signal 328 indicates that a wafer or a wafer fragment has become dislodged from a carrier 124, CMP controller 330 will quickly shut down the motors on the system, stopping processing and ensuring that the other wafers being polished, and the CMP machine itself, are minimally damaged. In a particularly preferred embodiment of the invention, CMP controller 330 may include a separate control device connected to the CMP machine's main processor/controller, or CMP controller 330 may be configured as part of the main unit. Further, CMP controller 330 may be configured as part of processor 326. As will be appreciated by one skilled in the art, CMP controller 330 may employ any type and configuration of controller capable of shutting down the CMP machine.

The operation and configuration of probe assembly 129, and in particular an exemplary method of interpreting the optical signal from emitter probe 312 will now be described in conjunction with FIG. 3.

As briefly discussed above, different types of polishing pads 126 exhibit different reflective characteristics. In particular, CMP polishing apparatus 100, which is discussed in more detail above, may utilize at least two different kinds of pads: a primary polishing pad which generally exhibits a substantially light or white color; and a secondary polishing pad which generally exhibits a much darker color. As described above, probe 129 is desirably positioned at an angle relative to surface 322 of polishing pad 126. Probe 129, and emitter 312 in particular, is positioned such that interrogation signal 314 is directed toward polishing pad 126 at an angle 332 between 10 and 20 degrees, and preferably at an angle of approximately 15 degrees, relative to surface 322. The alignment angle may be selected according to the optical characteristics of polishing pad 126, the extraneous material to be detected, or probe 129 itself. The use of probe 129 enables the present invention to operate consistently under a variety of conditions and with a number of different polishing pads 126 without having to adjust angle 332.

During operation, emitter 312 suitably projects a substantially monochromatic light onto polishing pad 126 near carrier element 124. Given the characteristics of polishing pad 126, reflected signal 316 will be reflected from the pad generally toward detector 315. It should be appreciated that an amount of light may be reflected in various directions not shown in FIG. 3, and that detector 315 may only receive some of the light reflected from polishing pad 126. As a consequence of the pressure of the slurry, deionized water flow ripple, air bubbling, carrier agitation, or long term discoloration of the pad, the energy received by detector 315 is generally about 50% to about 75% of the light energy which would otherwise be received absent these factors. As polishing pad 126 becomes more discolored, the amount of received light will decrease. Using a light-colored pad, the amount of light received probably will not be reduced by more than 50%.

If a wafer or a wafer fragment becomes dislodged from carrier element 124, at least a portion of interrogation signal 314 radiated from emitter 312 will contact the wafer or wafer fragment, as opposed to polishing pad 126. In accordance with this aspect of the invention, because of the distinct reflective properties of the wafer (relative to polishing pad 126), the amount of light energy contained in reflected signal 316 will be different than the amount reflected from polishing pad 126 alone. When processor 326 receives control signal 320 in response to a reflected signal 316 from a wafer rather than from polishing pad 126, processor generates output signal 328 to CMP controller 330 to shut off the machine or to commence other corrective action.

Although the subject invention is described herein in conjunction with the appended drawing figures, it will be appreciated that the invention is not limited to the specific form shown. Various modifications in the selection and arrangement of parts, components, and processing steps may be made in the implementation of the invention. For example, although the preferred embodiment employs an infrared LED light source, it will be appreciated that virtually any substantially monochromatic interrogation signal may be utilized such that in-process, in-situ monitoring of polishing pads is possible. Moreover, although the emitter, detector, converter, processor, and CMP controller are illustrated in FIG. 3 in schematic form, it will be appreciated that only the probe need be disposed proximate the workpieces and polishing pad; the processor and other components may be disposed remotely from the workpiece as desired. These and other modifications may be made in the design and arrangement of the various components which implement the invention without departing from the spirit and the scope of the invention as set forth in the appended claims.

What is claimed is:

1. In a workpiece processing system having a processing element and a carrier element configured to hold a workpiece against said processing element, a method for detecting the presence of extraneous material on said processing element during operation of said workpiece processing system, said method comprising the steps of:

directing an interrogation signal at an area of said processing element proximate said carrier element;

detecting a reflected signal produced in response to said interrogation signal;

converting said reflected signal into a control signal;

indicating the presence of said extraneous material proximate said area when said control signal is measured within a predetermined range; and refraining from indicating the presence of said extraneous material proximate said area when said control signal is not measured within said predetermined range.

2. A method according to claim 1, wherein said interrogation signal is generated by a substantially monochromatic light source.

3. A method according to claim 2, wherein said light source is an infrared LED emitter.

4. A method according to claim 1, wherein said indicating step indicates when said workpiece is dislodged from said carrier element and wherein said extraneous material comprises said workpiece.

5. A method according to claim 1, wherein said processing element comprises a polishing pad having a relatively planar polishing surface and said directing step directs said interrogation signal at an angle between 10 and 20 degrees relative to said polishing surface.

6. A method according to claim 1, further comprising the step of adjusting an operating parameter of said workpiece processing system in response to said indicating step.

7. A method according to claim 1, wherein said control signal has an associated analog voltage and said method further comprises the steps of:

establishing a first range for said analog voltage indicative of a first number of processing elements having a first reflectivity range;

establishing said predetermined range for said analog voltage such that said predetermined range is indicative of said extraneous material; and establishing a second range for said analog voltage indicative of a second number of processing elements having a second reflectivity range.

8. A method according to claim 1, wherein said workpiece processing system comprises a chemical mechanical planarization (CMP) system configured to perform a planarization procedure, and said method further comprises the steps of:

directing a training signal at said area of said processing element proximate said carrier element prior to said planarization procedure;

detecting a reflected training signal produced in response to said training signal;

converting said reflected training signal into an output test signal having an analog voltage; and establishing a range for said analog voltage of said output test signal, said range being indicative of the reflectivity of said processing element.

9. A method according to claim 1, wherein said control signal has an electrical characteristic associated therein, said step of indicating occurs when said electrical characteristic is measured within said predetermined range; and said step of refraining occurs when said electrical characteristic is not measured within said predetermined range.

10. A method according to claim 9, wherein said electrical characteristic comprises an analog voltage.

* * * * *